United States Patent
Kurimoto

(10) Patent No.: US 12,388,608 B2
(45) Date of Patent: Aug. 12, 2025

(54) SLAVE TERMINAL, MONITORING SYSTEM, AND WIRELESS TRANSMISSION METHOD

(71) Applicant: PACIFIC INDUSTRIAL CO., LTD., Ogaki (JP)

(72) Inventor: Masaru Kurimoto, Ogaki (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 447 days.

(21) Appl. No.: 17/910,322

(22) PCT Filed: Sep. 13, 2021

(86) PCT No.: PCT/JP2021/033526
§ 371 (c)(1),
(2) Date: Sep. 8, 2022

(87) PCT Pub. No.: WO2022/070859
PCT Pub. Date: Apr. 7, 2022

(65) Prior Publication Data
US 2023/0155788 A1  May 18, 2023

(30) Foreign Application Priority Data
Oct. 2, 2020  (JP) .................................. 2020-167796

(51) Int. Cl.
*H04L 5/00* (2006.01)
*H04L 1/1812* (2023.01)
(Continued)

(52) U.S. Cl.
CPC .......... *H04L 5/0055* (2013.01); *H04L 1/1812* (2013.01); *H04W 56/003* (2013.01); *H04W 74/0808* (2013.01)

(58) Field of Classification Search
CPC .. H04L 5/0055; H04L 1/1812; H04W 56/003; H04W 74/0808; Y02D 30/70; A01K 29/00; G08C 15/00; G08C 17/00
See application file for complete search history.

(56) References Cited

U.S. PATENT DOCUMENTS

| 2007/0068240 A1* | 3/2007 | Watabe ............... B60C 23/0454 73/146.5 |
| 2010/0225357 A1* | 9/2010 | Priel ......................... G06F 1/14 327/47 |

(Continued)

FOREIGN PATENT DOCUMENTS

| JP | H10-70756 A | 3/1998 |
| JP | 2007-076457 A | 3/2007 |

(Continued)

OTHER PUBLICATIONS

Dec. 16, 2020 Office Action issued in Japanese Patent Application No. 2020-167796.

(Continued)

*Primary Examiner* — Hashim S Bhatti
(74) *Attorney, Agent, or Firm* — Oliff PLC

(57) ABSTRACT

A slave terminal includes: a data transmission unit that wirelessly transmits status data relating to a condition of a monitoring target to a monitoring apparatus in response to a transmission trigger at every fixed period; a reply check unit that determines whether or not an ACK signal was sent back from the monitoring apparatus in response to the status data that was transmitted; an adjustment value calculation unit that determines an adjustment period of a random length when there was no reply; a timing update unit that outputs a measurement start trigger after the adjustment period has elapsed when there was no reply, the timing update unit outputting the measurement start trigger without the adjustment period when there was a reply; and a trigger generation (Continued)

unit that outputs the transmission trigger after counting the fixed period in response to the measurement start trigger.

13 Claims, 10 Drawing Sheets

(51) Int. Cl.
    *H04W 56/00*     (2009.01)
    *H04W 74/0808*     (2024.01)

(56) References Cited

U.S. PATENT DOCUMENTS

| 2014/0056286 A1 | 2/2014 | Nagata |
| 2015/0031963 A1 | 1/2015 | Wright et al. |

FOREIGN PATENT DOCUMENTS

| JP | 4552813 B2 | 9/2010 |
| JP | 2014-525738 A | 10/2014 |
| WO | 2012/114738 A1 | 8/2012 |

OTHER PUBLICATIONS

Mar. 22, 2021 Office Action issued in Japanese Patent Application No. 2020-167796.
Nov. 22, 2021 International Search Report issued in International Patent Application No. PCT/JP2021/033526.

* cited by examiner

SLAVE TERMINAL, MONITORING SYSTEM, AND WIRELESS TRANSMISSION METHOD

TECHNICAL FIELD

The present disclosure relates to a slave terminal that wirelessly transmits status data relating to a condition of a monitoring target to a master terminal, a wireless transmission method, and a monitoring system for monitoring physical conditions of livestock in which the livestock animals as monitoring targets are equipped with the slave terminal.

BACKGROUND ART

One type of such a slave terminal, which wirelessly transmits data to a master terminal regularly, has hitherto been known (see, for example, Patent Document 1).

RELATED ART DOCUMENT

Patent Document

Patent Document 1: Japanese Patent No. 4552813 (paragraph [0075] and FIG. 4)

SUMMARY OF THE INVENTION

Technical Problem to be Solved by the Invention

The conventional slave terminal, in the case where a plurality of slave terminals is used per one master terminal, entailed problems such as cumbersome settings required for avoiding interference, and increased power consumption because of repeated wireless transmissions for avoiding interference. Accordingly, the present disclosure provides a technique that enables interference avoidance in a less cumbersome manner and with less power consumption than before.

Means of Solving the Problem

A slave terminal according to a first aspect of the present disclosure made to solve the above problem is a slave terminal including: a data transmission unit that wirelessly transmits status data relating to a condition of a monitoring target to a monitoring apparatus in response to a transmission trigger at every fixed period; a reply check unit that determines whether or not an ACK signal was sent back from the monitoring apparatus in response to the status data that was transmitted; an adjustment value calculation unit that determines an adjustment period of a random length when the reply check unit has determined that there was no reply; a timing update unit that outputs a measurement start trigger after the adjustment period has elapsed when the reply check unit has determined that there was no reply, the timing update unit outputting the measurement start trigger without the adjustment period when the reply check unit has determined that there was a reply; and a trigger generation unit that outputs the transmission trigger after counting the fixed period in response to the measurement start trigger.

A slave terminal according to a second aspect of the present disclosure is a slave terminal including: a data transmission unit that wirelessly transmits status data relating to a condition of a monitoring target to a monitoring apparatus in response to a transmission trigger at every fixed period; a reply check unit that determines whether or not an ACK signal was sent back from the monitoring apparatus in response to the status data that was transmitted; an adjustment value calculation unit that determines an adjustment period of a random length when the reply check unit has determined that there was no reply; a trigger generation unit that sequentially generates the transmission trigger at every fixed period; and a timing update unit provided to the trigger generation unit, the timing update unit shifting timings of generation of transmission triggers that are sequentially generated thereafter from a timing of generation of a current transmission trigger by the adjustment period when the reply check unit has determined that there was no reply.

A wireless transmission method according to a third aspect of the present disclosure is a wireless transmission method for wirelessly transmitting status data relating to a condition of a monitoring target from a slave terminal to a monitoring apparatus at every fixed period, wherein when the slave terminal has received an ACK signal from the monitoring apparatus in response to a transmission of the status data, the status data to be sent thereafter at every fixed period is transmitted at a timing that is the same as a current transmission timing, whereas, when the slave terminal has not received an ACK signal, the status data to be sent thereafter at every fixed period is transmitted at a timing that is shifted by a randomly determined adjustment period from a current transmission timing.

MODE FOR CARRYING OUT THE INVENTION

First Embodiment

Figure 1:
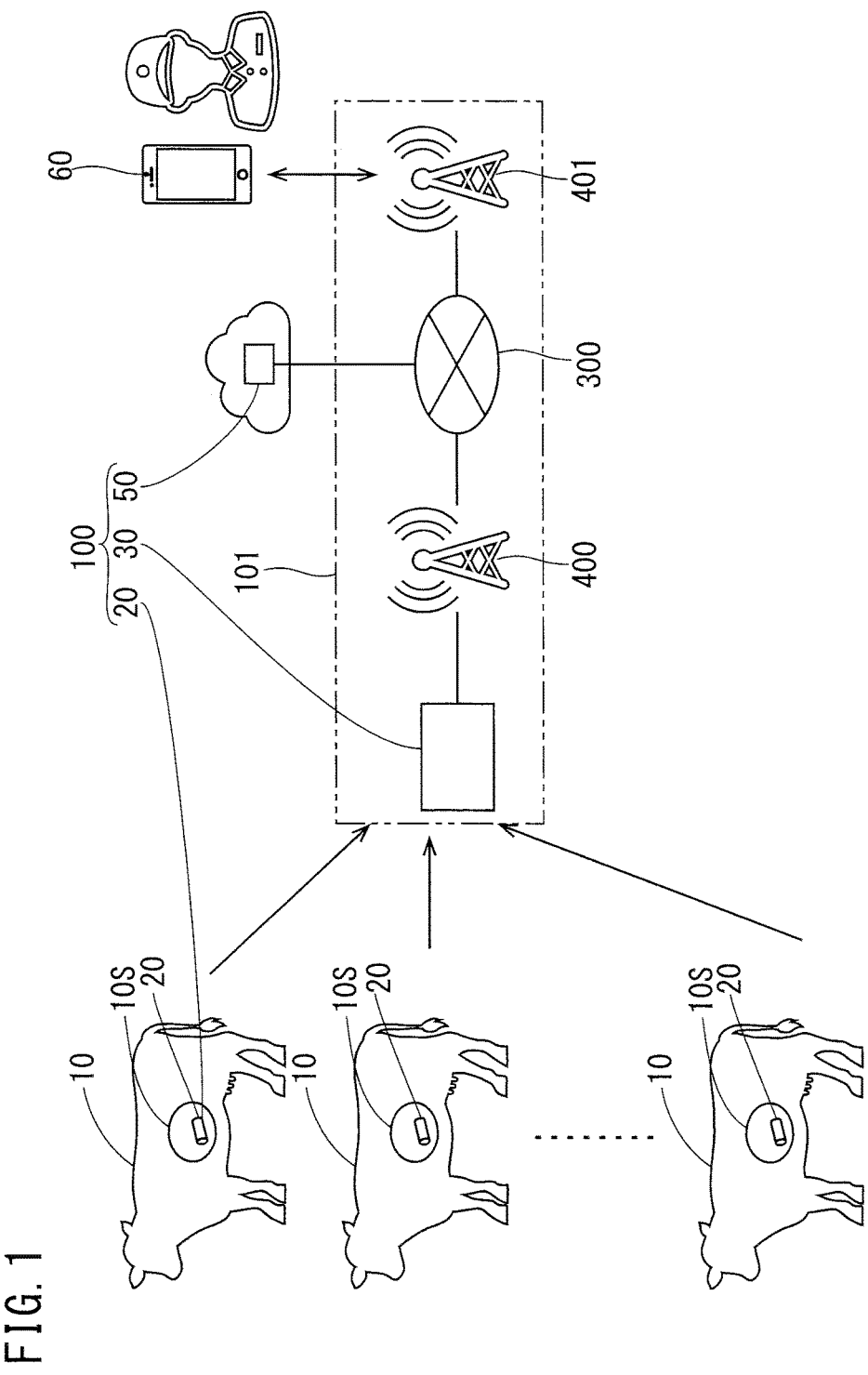
FIG. 1 is a schematic diagram illustrating an overall configuration of a monitoring system according to one embodiment of the present invention.

A first embodiment of the monitoring system 100 according to the present disclosure will be described with reference to FIG. 1 to FIG. 6. The monitoring system 100 of this embodiment shown in FIG. 1 includes a plurality of slave terminals 20 left in stomachs 10S (specifically, first or second chamber of stomach) of a plurality of cows 10 that is to be monitored, a master terminal 30, and a cloud server 50. These are connected to each other via a communication network 101 including wireless base stations 400 and 401, so that data relating to conditions of cows 10 wirelessly transmitted from the plurality of slave terminals 20 is received by the master terminal 30 and collected in the cloud server 50. The master terminal 30 and cloud server 50 correspond to a "monitoring apparatus" in the claims.

Figure 2:
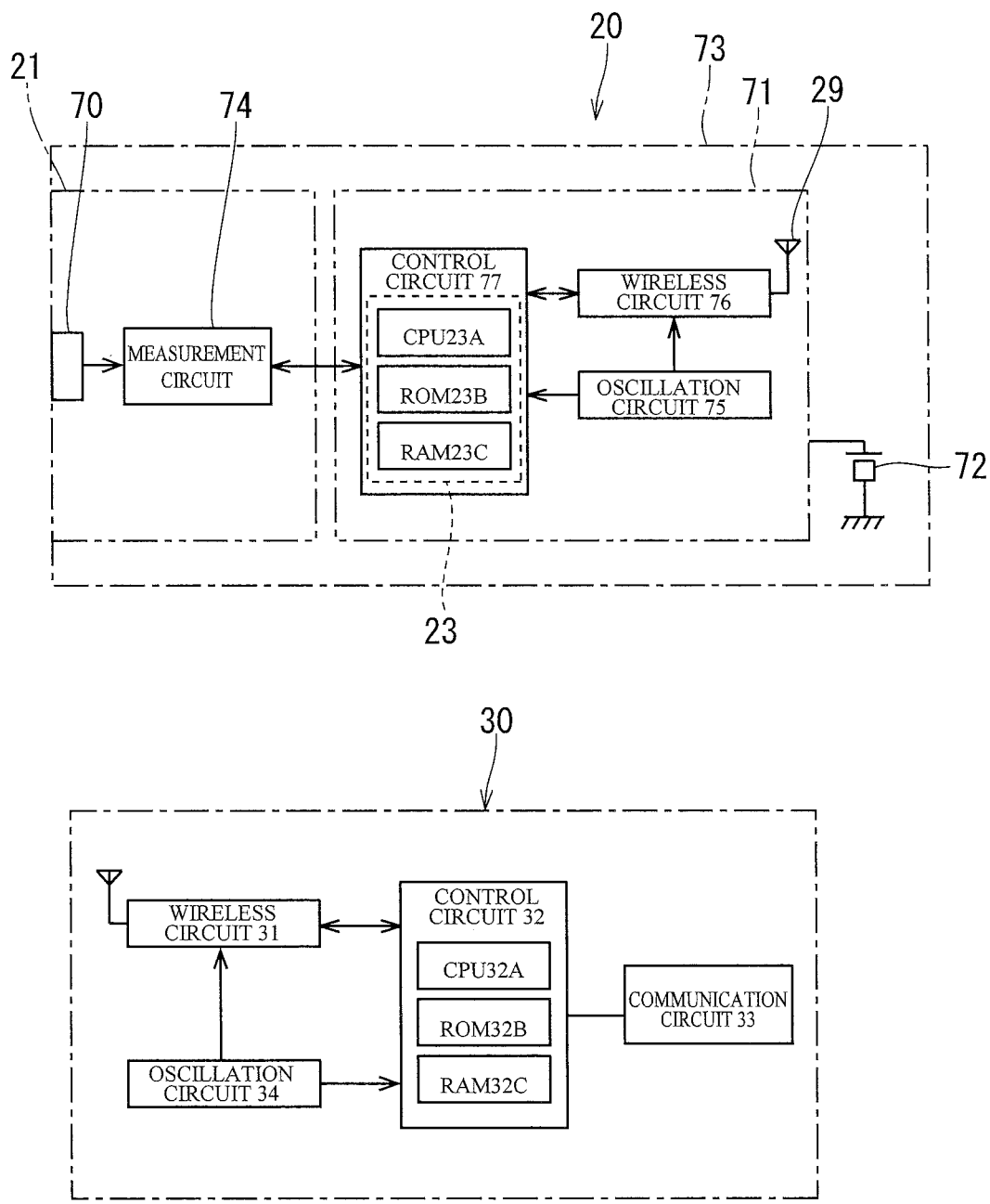
FIG. 2 is a block diagram illustrating an electrical configuration of a slave terminal and a master terminal.

As shown in FIG. 2, the slave terminal 20 is equipped with a pressure sensor 70, a circuit board 71, a battery 72, etc., contained inside a waterproof case 73. The pressure sensor 70 has a pressure-receiving surface that is exposed to the outside of the waterproof case 73. A measurement unit 21 made up of the pressure sensor 70 and a measurement circuit 74 measures pressure inside the stomach 10S, which is one of the conditions of the cow 10.

The circuit board 71 includes an oscillation circuit 75, a wireless circuit 76, a control circuit 77, etc., mounted thereon. The oscillation circuit 75 has an oscillator as a main part, and provides the wireless circuit 76 and control circuit 77 with a periodic signal based on which carrier waves are sent or time is measured. The wireless circuit 76 sends and receives wireless signals and includes an antenna 29, which is for example a coil antenna printed on the circuit board 71. The control circuit 77 has a microcomputer 23 as a main part, which includes a CPU 23A, a ROM 23B, and a RAM 23C. The ROM 23B stores identification numbers assigned to respective slave terminals 20, and first and second control programs PG1 and PG2 to be described later (see FIG. 5 and FIG. 6). The CPU 23A repeatedly executes the first and second control programs PG1 and PG2 in predetermined cycles to operate as control blocks such as a data transmission unit 22, a trigger generation unit 25, etc., in FIG. 3.

Pressure data measured by the measurement unit 21 of the slave terminal 20 is wirelessly transmitted by the wireless circuit 76 and received by the master terminal 30. The master terminal 30, operable as a relay base station and a protocol converter, is installed in a cowhouse or farm, for example, where a plurality of cows 10 is being raised. The master terminal 30 sends the data transmitted from the slave terminal 20 to the cloud server 50 via a general-purpose communication line 300. The cloud server 50 compares the pressure data sent from the plurality of slave terminals 20, identifies the slave terminal 20 that has sent abnormal pressure data, for example, and sends a notification to a user terminal 60 owned by a livestock owner (see FIG. 1). While one master terminal 30 is connected to one cloud server 50 in this embodiment, a plurality of master terminals 30 may be connected to one cloud server 50, with the master terminal 30 being installed in each of cowhouses or farms, for example.

The master terminal 30 includes a wireless circuit 31, a control circuit 32, a communication circuit 33, and an oscillation circuit 34. The control circuit 32 includes a CPU 32A, a ROM 32B, and a RAM 32C, and executes a predetermined control program (not shown) stored in the ROM 32B to operate as control blocks such as a data receiving and processing unit 35A, an ACK signal transmission unit 35B, etc., in FIG. 3. The ROM 32B also stores an identification number of the master terminal 30.

Figure 3:
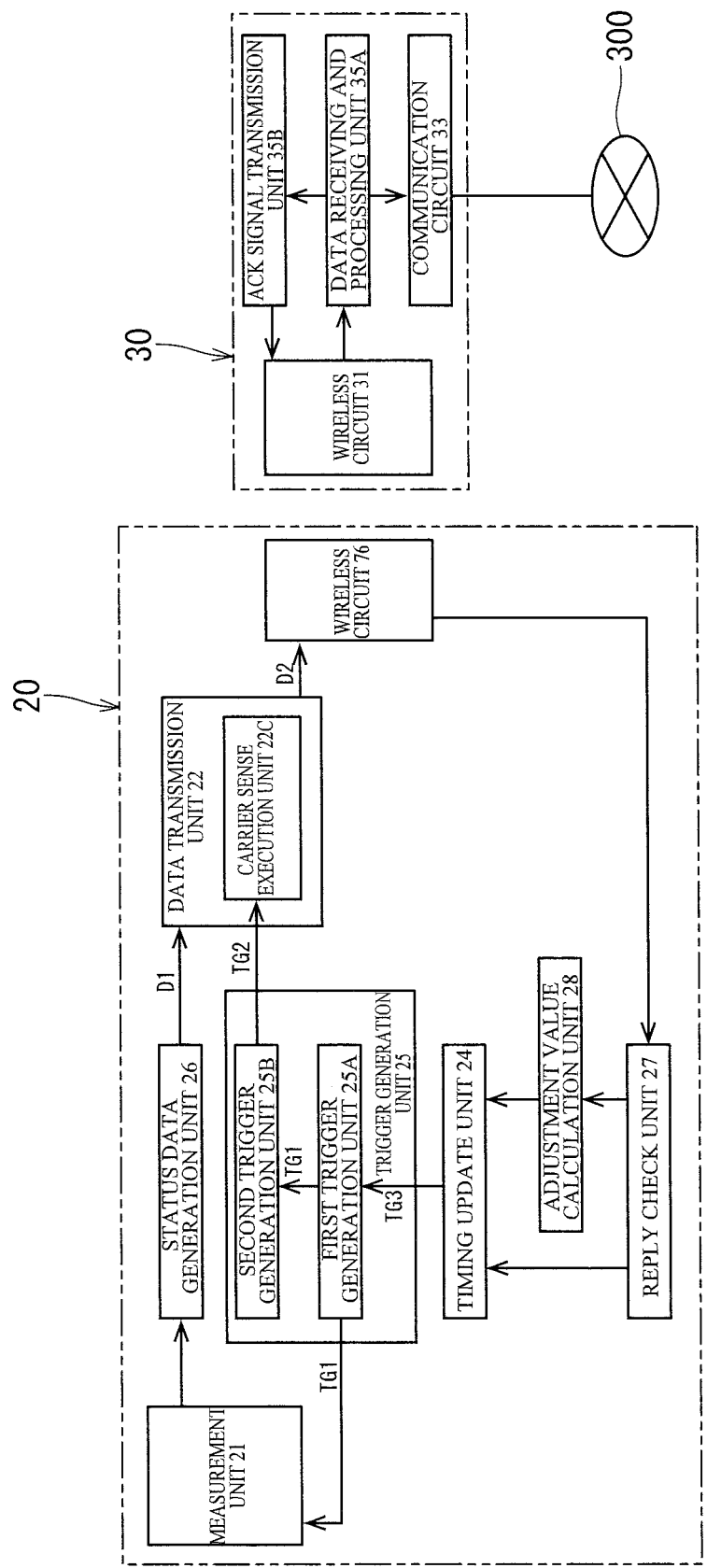
FIG. 3 is a block diagram illustrating a control configuration of the slave terminal and master terminal.

To be more specific, the trigger generation unit 25 of the slave terminal 20 shown in FIG. 3 includes a first trigger generation unit 25A and a second trigger generation unit 25B. The first trigger generation unit 25A generates a first trigger TG1 and gives it to the measurement unit 21. The timing of generation of the first trigger TG1 is set by a timing update unit 24. To be more specific, upon receiving a measurement start trigger TG3 from the timing update unit 24, the first trigger generation unit 25A generates the first trigger TG1 after the elapse of a fixed period T4 (e.g., 10 minutes). In response to this, the measurement unit 21 measures the pressure inside the stomach 10S of the cow 10. A status data generation unit 26 generates status data D1 from the measurement result and gives it to the data transmission unit 22.

The data transmission unit 22 generates transmission data D2 wherein an identification number of the slave terminal 20 and pressure data are stored in a data frame of a predetermined data length. Each time the first trigger TG1 is generated, the second trigger generation unit 25B sequentially generates the transmission trigger TG2 delayed by a prescribed delay time Δt1 from the first trigger TG1, and wirelessly transmits the transmission data D2 using the wireless circuit 76. The prescribed delay time Δt1, which is set to 0.6 seconds in this embodiment, is for securing time for the status data generation unit 26 to generate transmission data D2. Hereinafter the data transmission unit 22 sending transmission data D2 shall mean the same as the data transmission unit 22 wirelessly transmitting transmission data D2 using the wireless circuit 76.

When the data transmission unit 22 transmits transmission data D2, a reply check unit 27 determines whether or not the wireless circuit 76 has received an ACK signal sent in reply from the master terminal 30 before the elapse of a waiting period Δt2. Hereinafter, this will simply be expressed as the reply check unit 27 determining whether or not an ACK signal has been sent back. In this embodiment, the waiting period Δt2 is set to 3 seconds, for example.

The data receiving and processing unit 35A of the master terminal 30 adds a receipt time to the data sent from each slave terminal 20 and received by the wireless circuit 31 of the master terminal 30 and sends the data to the cloud server 50. The data receiving and processing unit 35A extracts an identification number of the slave terminal 20 included in the transmission data from each slave terminal 20 and gives it to the ACK signal transmission unit 35B. In response, the ACK signal transmission unit 35B generates an ACK signal wherein the identification number of the slave terminal 20 and the identification number of the master terminal 30 are stored in a predetermined data frame, and wirelessly transmits the ACK signal via the wireless circuit 31. This allows the reply check unit 27 of each slave terminal 20 to determine whether or not the transmission data D2 was received by the master terminal 30 based on whether or not an ACK signal including the identification number of its own has been received.

If the reply check unit 27 determines that no ACK signal was sent back, then an adjustment value calculation unit 28 determines an adjustment period Rt of a random length. The adjustment period Rt is for causing the transmission timings to be shifted from one another when interference occurs at the time of reception at the master terminal 30. Then, after the reply check unit 27 has determined that no ACK signal was sent back, when the adjustment period Rt has elapsed, the timing update unit 24 generates the measurement start trigger TG3, and gives the trigger to the first trigger generation unit 25A. As mentioned above, upon receiving the measurement start trigger TG3, the first trigger generation unit 25 generates the first trigger TG1 after the elapse of the fixed period T4.

If the reply check unit 27 determines that an ACK signal was sent back, then the adjustment value calculation unit 28 sets the adjustment period Rt to "0." In this case, the timing update unit 24 generates the measurement start trigger TG3 immediately after the determination that an ACK signal was sent back, and gives the trigger to the first trigger generation unit 25A. Namely, when there is interference at the time of reception at the master terminal 30, the timing of generation of the first trigger TG1 by the first trigger generation unit 25A is delayed by the adjustment period Rt compared to a case where there is no interference.

When, after the generation of the first trigger TG1 and elapse of the prescribed delay time Δt1, next transmission data D2 is transmitted and the reply check unit 27 determines that no ACK signal was sent back, the adjustment value calculation unit 28 likewise sets a new adjustment period Rt of a random length. Therefore, the timing of generation of the measurement start trigger TG3 to be given by the timing update unit 24 to the first trigger generation unit 25A after that will be delayed by the new adjustment period Rt.

The slave terminal 20 of this embodiment shifts the timing of sending transmission data D2 in this way by delaying the timing of next measurement by the measurement unit 21 when there is no ACK signal in reply to the transmission data D2 that has been sent, and repeats this change of timing until an ACK signal is sent back. This obviates the need for setting transmission timings for the plurality of slave terminals 20 such as to be shifted from one another beforehand, since the transmission timings of all the slave terminals 20 are scheduled in sequence such as not to overlap as the slave terminals 20 repeat transmissions.

Figure 4:
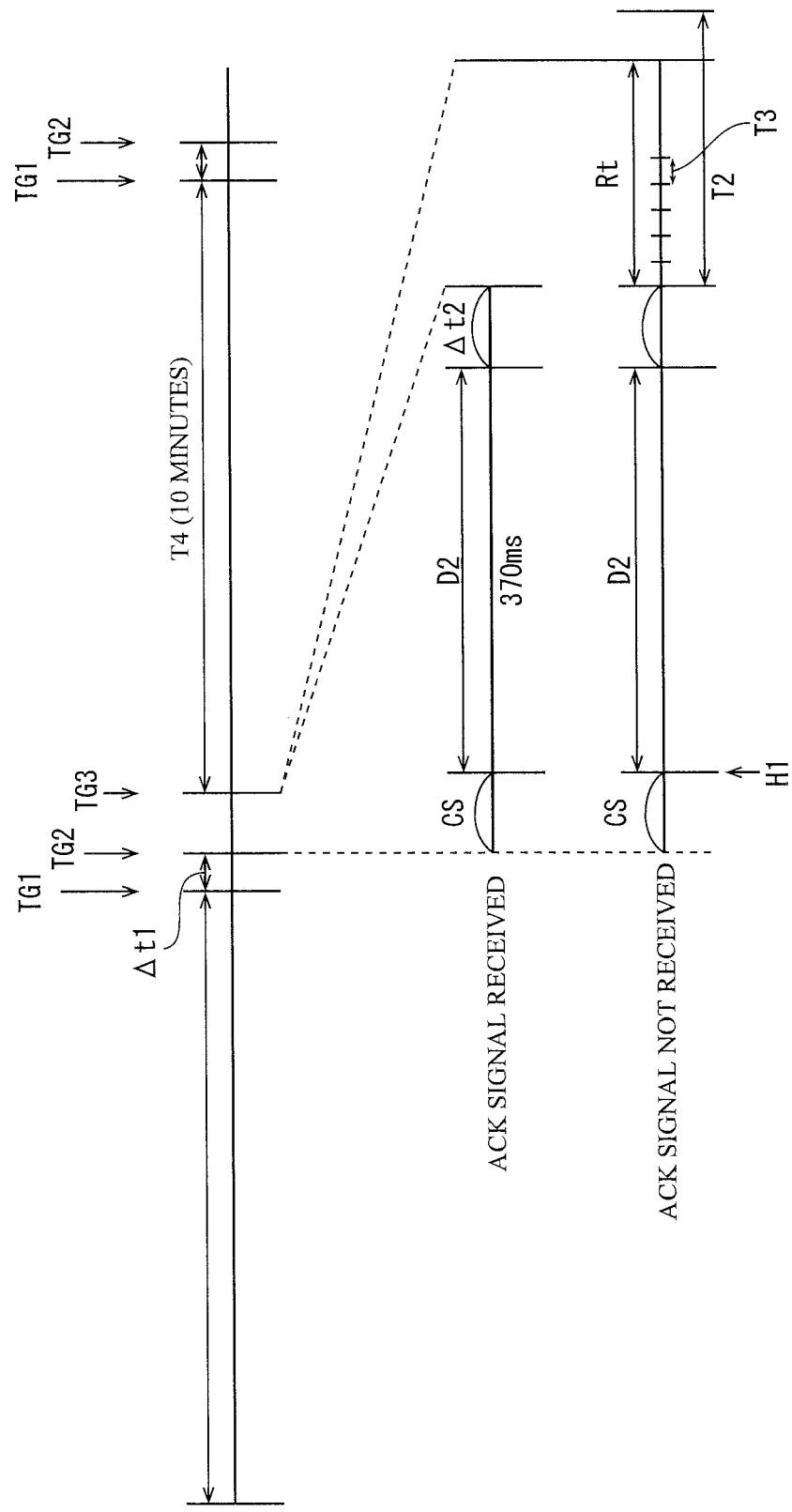
FIG. 4 is a time chart showing trigger generation timings.

FIG. 4 illustrates a conceptual diagram of the timings of generation of various triggers described above. In FIGS. 4, TG1, TG2, and TG3 respectively represent the timings of generation of the first trigger TG1, the transmission trigger TG2, and the measurement start trigger. H1 represents the timing at which the data transmission unit 22 transmits transmission data D2. The adjustment value calculation unit 28 and data transmission unit 22 mentioned above will be described in more detail below with reference to FIG. 4.

The adjustment value calculation unit 28 determines the adjustment period Rt such as to vary randomly by unit of a prescribed allocation length T3 within a range of a prescribed maximum amplitude T2, after the transmission data D2 has been sent and the waiting period Δt2 has elapsed. In this embodiment, the prescribed maximum amplitude T2 is set to 1 minute, for example, which is 1/10 of the fixed period T4 (e.g., 10 minutes), and the prescribed allocation length T3 is set to 0.6 seconds. That is, the adjustment value calculation unit 28 determines a value obtained by multiplying a random number selected from 100 random numbers (=1 minute/0.6 seconds) by 0.6, which is the prescribed allocation length T3, as the adjustment period Rt. In this embodiment, transmission data D2 wirelessly transmitted by the data transmission unit 22 has a data length (i.e., data length of a data frame) of, for example, 0.37 seconds.

In a concrete example of selecting one random number from 100 random numbers, for example, a value P of pressure measured by the measurement unit 21 is input to a random number generator function RAN(P) contained in the second control program PG2 to be described later. To be more specific, for example, the random number generator function RAN(P) extracts upper four digits of the input value P of pressure, for example, and produces a random number by determining the remainder after dividing an integer consisting of numerals of the 4 digits by 100. In another possible configuration, for example, a random number calculation IC may be mounted on the circuit board 71, and the remainder after dividing a random number output by this IC by 100 may be determined as one of the 100 random numbers from 0 to 99.

The data transmission unit 22 includes a carrier sense execution unit 22C (see FIG. 3). When the transmission trigger TG2 is generated, the carrier sense execution unit 22C performs a carrier sense before the transmission data D2 is sent. When a transmission channel is determined to be available for the data transmission unit 22, the transmission data D2 is sent, and when no transmission channel is available, the data transmission unit does not send the transmission data D2 and waits until a transmission channel becomes available. If no transmission channel is determined to be available until the elapse of time for transmission of the transmission data D2 (0.37 seconds) from the generation of the transmission trigger TG2, the data transmission unit does not send the transmission data D2.

The first and second control programs PG1 and PG2 (see FIG. 5 and FIG. 6) executed by the CPU 23A of the slave terminal 20 will be described below. The CPU 23A executes the first and second control programs PG1 and PG2 every time it receives an interrupt signal at an interval of 0.6 seconds, for example, as a periodic signal output from the oscillation circuit 75. "T1" in the first control program PG1 represents a counter for counting the time. "FLG1, FLG2, FLG3" in the first and second control programs PG1 and PG2 represent flags, which are "0" in an initial state. "N1" represents a set value for determining the length of the fixed period T4 mentioned above. In this embodiment, N1 is set to 1000 (=ten minutes×60 seconds/0.6 seconds) so that the fixed period T4 is 10 minutes. "R" represents a variable that stores the random number. The initial value of R is "0." For convenience of explanation, R shall be referred to as random number hereinafter. TOF(FLG, X) included in the first and second control programs PG1 and PG2 is a function, which normally outputs "0." When FLG changes from "0" to "1", interrupt signals from the oscillation circuit 75 at an interval of 0.6 seconds are counted by an internal counter, and when the count result matches X, the function outputs "1." MOD (T, N) included in the first control program PG1 is a function that outputs a remainder after dividing T by N.

Figure 5:
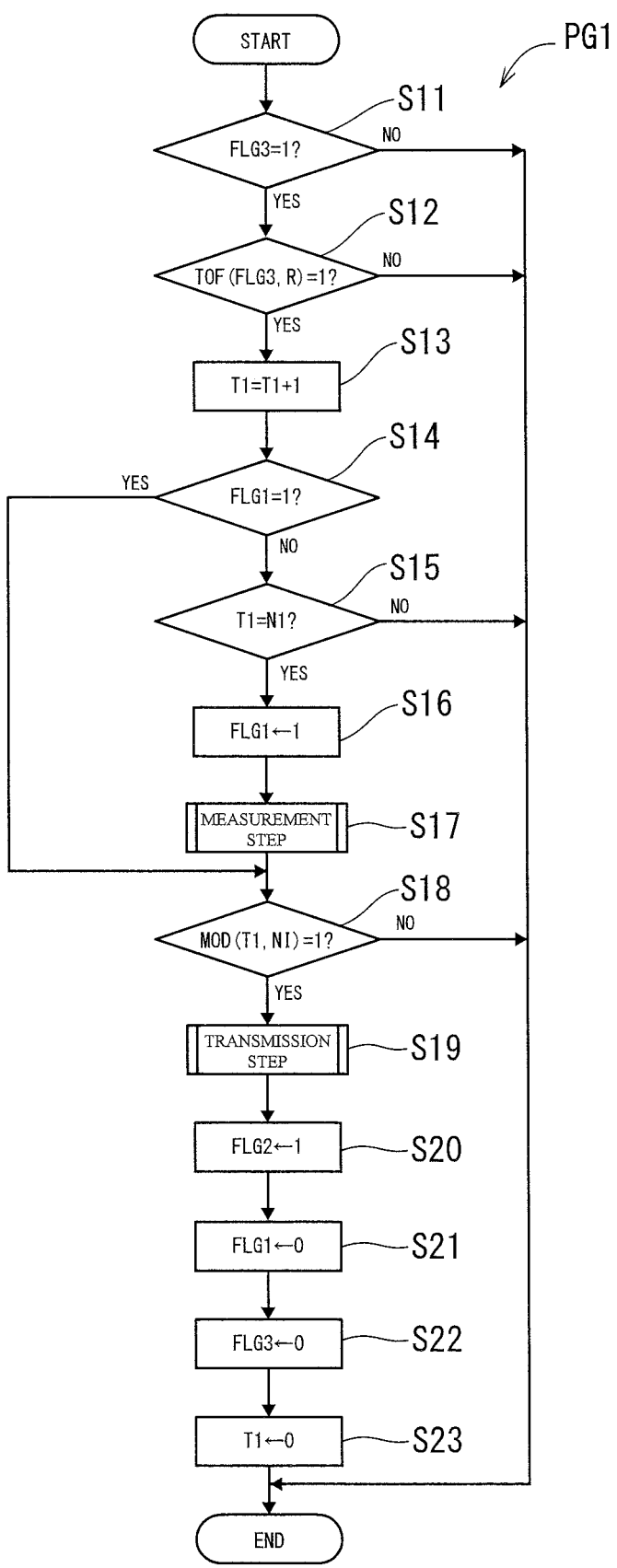
FIG. 5 is a flowchart of a first control program.

As shown in FIG. 5, the CPU 23A executing the first control program PG1 determines whether or not FLG3 is "1" (S11), and if not "1," then immediately exits the first control program PG1 (NO at S11). Namely, the CPU 23A in effect executes the first control program PG1 only when FLG3 is set to "1" in the first control program PG1 (which corresponds to when the reply check unit 27 described above determines whether or not an ACK signal was sent back). If FLG3 is "1" (YES at S11), then the CPU 23A determines at step S12 whether or not the number of counts of interrupt signals since FLG3 was set to "1" from "0" has matched the random number R using the function TOF(FLG3, R). After the internal counter of the function TOF(FLG3, R) has counted R, the CPU increments the counter T1 by 1 (S13), and determines whether or not FLG1 is "1" (S14). If not "1" (NO at S14), the CPU determines whether or not the number of counts has matched N1 (S13). If YES, then the CPU switches FLG1 from "0" to "1" (S16), and executes a measurement step (S17). Here, the CPU 23A executing step S12 corresponds to the timing update unit 24 described above. Determining YES at step S12 corresponds to generation of the measurement start trigger TG3. A value obtained by multiplying the random number R by 0.6 seconds, which is the period of interrupt signals, corresponds to the adjustment period Rt described above. The CPU 23A executing step S15 corresponds to the first trigger generation unit 25A described above. Determining YES at step S15 corresponds to generation of the first trigger TG1. Switching FLG1 from "0" to "1" at step S16 corresponds to the fixed period T4 mentioned above having elapsed.

After executing the measurement step (S17), the CPU 23A operates as the status data generation unit 26, i.e., receives a result of measurement by the pressure sensor 70 from the measurement circuit 74, converts it into a digital signal, and generates pressure data.

The CPU 23A determines whether or not the remainder after dividing "counter T1" by N1 is "1" (S18) after the execution of the measurement step (S17), and if YES, executes a transmission step (S19). Here, the CPU 23A executing step S18 corresponds to the second trigger generation unit 25B described above, i.e., the transmission trigger TG2 is generated after the prescribed delay time Δt1 (0.6 seconds) from the generation of the first trigger TG1.

The CPU 23A executing the transmission step (S19) corresponds to the data transmission unit 22. In the transmission step (S19), the CPU generates transmission data D2, performs the carrier sense, and sends the transmission data D2 as the data transmission unit 22 as described in the foregoing. Depending on the result of the carrier sense, the transmission data D2 may not be sent due to interference.

When the transmission step (S19) is executed, FLG2 is set to "1" from "0," and FLG1 is reset to "0" from "1" irrespective of whether or not the transmission data D2 has been sent (S20, 21). FLG3 is reset to "0" from "1" (S22), and lastly the counter T1 is reset to "0," whereupon the first control program PG1 is ended (S23).

Figure 6:
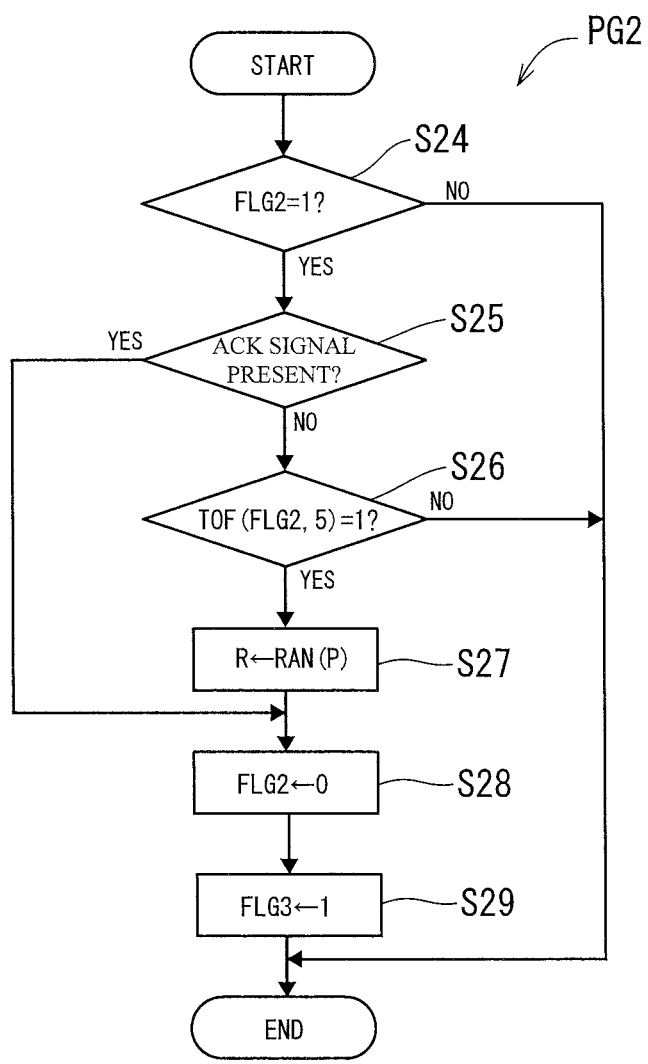
FIG. 6 is a flowchart of a second control program.

As shown in FIG. 6, the CPU 23A executing the second control program PG2 determines whether or not FLG2 is "1" (S24), and if not "1," then immediately exits the second control program PG2 (NO at S24). Namely, the CPU 23A in effect executes the second control program PG2 only when FLG2 is set to "1" in the first control program PG1 (only when the transmission step (S20) was executed). The CPU 23A then determines whether or not the wireless circuit 76 of the slave terminal 20 has received an ACK signal (S25), and if an ACK signal has been received (YES at S25), resets FLG2 to "0," sets FLG3 to "1" from "0," and exits the second control program PG2 (S28, 29). Here, switching FLG3 from "0" to "1" at step S29 corresponds to the reply check unit 27 described above determining whether or not an ACK signal was sent back.

When failing to receive an ACK signal (NO at S25), the CPU determines at step S26 whether or not the number of counts of interrupt signals since FLG2 was set to "1" from "0" has matched 5 using the function TOF(FLG2, 5). The CPU waits for an ACK signal until the internal counter of the function TOF(FLG2,5) has counted 5, i.e., until 3 seconds of the waiting period Δt2 have passed after FLG2 turned "1" (NO at S26). If no ACK signal was received after the elapse of 3 seconds after FLG2 turned "1" (NO at S25, YES at S26), the CPU stores a value obtained by inputting the measurement result of pressure to the random number generator function RAN(P) mentioned above in the random number R (S27), resets FLG2 to "0," sets FLG3 to "1" from "0," and exits the second control program PG2 (S28, 29).

The structure of the monitoring system 100 according to this embodiment has been described above. According to the monitoring system 100 that uses the plurality of slave terminals 20 of this embodiment, transmission data D2 containing status data D1 of a plurality of cows 10 that is to be monitored (data of pressure inside the stomachs 10S) is sent at a certain interval to the master terminal 30 and accumulated in the cloud server 50, so that changes in conditions of the plurality of cows 10 can be collectively monitored at the cloud server 50.

When all the slave terminals 20 send transmission data D2 to the master terminal 30 at a fixed interval of time T4, a situation could arise where interference occurs due to overlapping transmission timings, causing the master terminal 30 to fail to receive transmission data D2 from some or all of the slave terminals 20 and to send back an ACK signal to the slave terminals 20.

In the monitoring system 100 of this embodiment, the slave terminal 20 that did not receive an ACK signal sends transmission data D2 at a timing shifted by delaying the timing of next measurement by the measurement unit 21 by a randomly determined adjustment period Rt. The adjustment period Rt is set to "0" for the slave terminal 20 that did receive an ACK signal so that the timing of next measurement by the measurement unit 21 is not shifted. This obviates the need for setting transmission timings for the plurality of slave terminals 20 such as to be shifted from one another beforehand, since the transmission timings of all the slave terminals 20 are scheduled in sequence such as not to overlap as the slave terminals 20 repeat transmissions. Namely, using the plurality of slave terminals 20 of this embodiment enables interference avoidance in a less cumbersome manner and with less power consumption than before.

The slave terminal 20 of this embodiment can shift the transmission timings of slave terminals 20 from one another to avoid interference without changing the overall schedule of the plurality of slave terminals 20 to transmit status data D1 at every fixed period T4, since the prescribed maximum amplitude T2 of the adjustment period Rt is 1/10 or less of the fixed period T4. The adjustment period Rt is determined such as to vary randomly by unit of the prescribed allocation length T3 within a range of the prescribed maximum amplitude T2. Since the prescribed allocation length T3 is 1/100 of the prescribed maximum amplitude T2, it is possible to avoid interference for up to 100 slave terminals 20.

Failure to receive an ACK signal does not cause each slave terminal 20 to transmit again, which also helps avoid interference and reduce power consumption. Moreover, each slave terminal 20 transmitting after performing the carrier sense also helps avoid interference.

Second Embodiment

This embodiment differs from the first embodiment in that the timing of measurement by the measurement unit 21 is set to arrive at every fixed period T4 irrespective of whether or not an ACK signal was sent back to a slave terminal 20V, and the transmission timing of transmission data D2 is shifted by an adjustment period Rt that is randomly determined when no ACK signal was sent back. Only the features of the slave terminal 20V of this embodiment that are different from those of the slave terminal 20 of the first embodiment will be described below.

Figure 7:
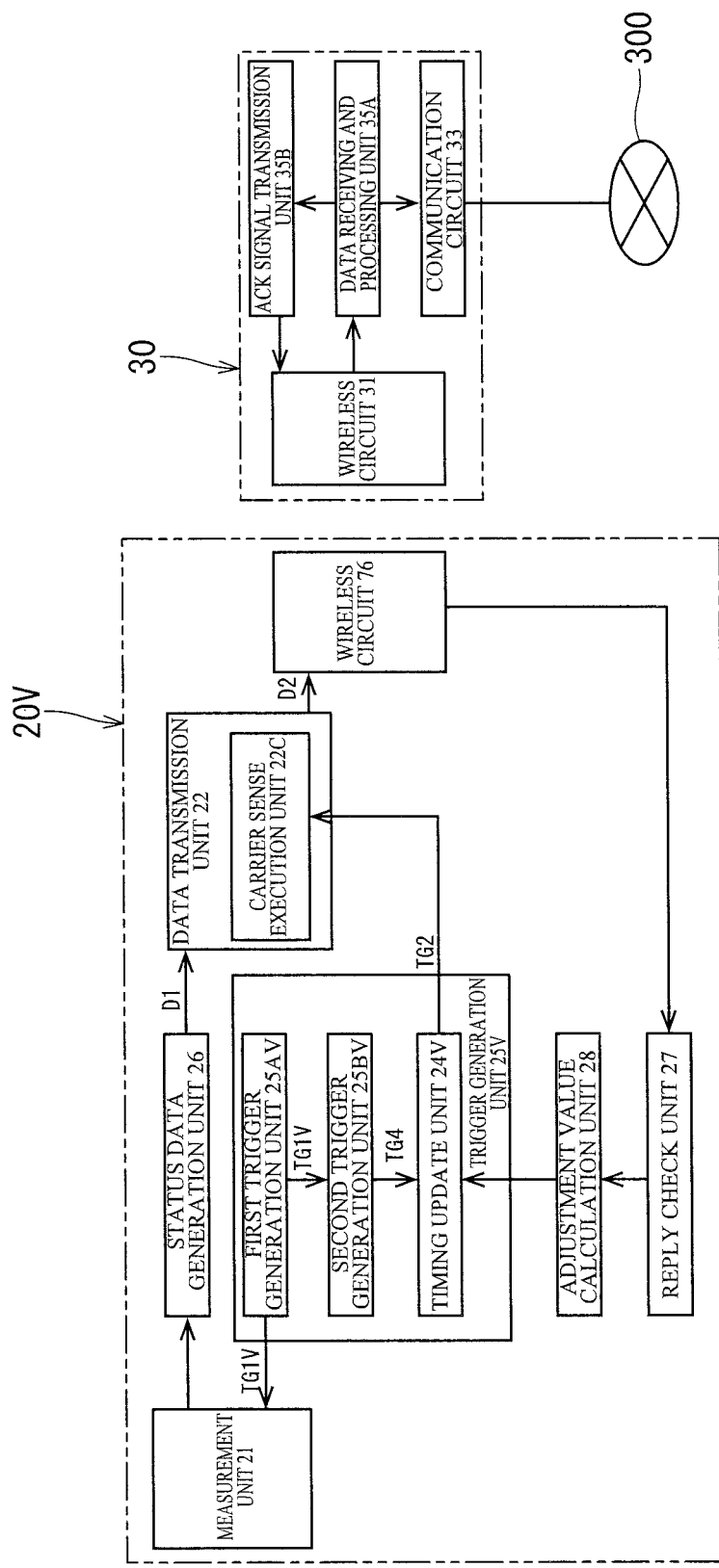
FIG. 7 is a block diagram illustrating a control configuration of a slave terminal and a master terminal according to a second embodiment.

To be more specific, a trigger generation unit 25V of the slave terminal 20V includes a timing update unit 24V, a first trigger generation unit 25AV, and a second trigger generation unit 25BV, as shown in FIG. 7. The first trigger generation unit 25AV generates a first trigger TG1V sequentially at every fixed period T4 and gives it to the measurement unit 21. Similarly to the first embodiment, the measurement unit 21 measures the pressure inside the stomach 10S of the cow 10, and the status data generation unit 26 generates status data D1 from the measurement result and gives it to the data transmission unit 22.

The transmission trigger TG2 is generated at a timing shifted from the first trigger TG1V by a period that is a sum of a prescribed delay time Δt1 and an adjustment period Rt. To be more specific, each time the first trigger TG1V is generated, the second trigger generation unit 25BV sequentially generates a second trigger TG4 delayed from the first trigger TG1V by the prescribed delay time Δt1. In this embodiment, the prescribed delay time Δt1 is set to 0.5 seconds.

The adjustment period Rt is for causing the transmission timings to be shifted from one another when interference occurs at the time of reception at the master terminal 30. The adjustment period Rt in the initial setting is "0," for example. Each time a second trigger TG4 is generated, the timing update unit 24V generates a transmission trigger TG2 delayed from the second trigger TG4 by the adjustment period Rt. In the initial state, the second trigger TG4 and transmission trigger TG2 are the same. In response to the transmission trigger TG2, the data transmission unit 22 wirelessly sends the transmission data D2. When the data transmission unit 22 sends the transmission data D2, the reply check unit 27 determines whether or not the wireless circuit 76 received an ACK signal sent in reply from the master terminal 30 before the elapse of the waiting period Δt2. The waiting period Δt2 is set to 10 seconds, for example, in this embodiment.

If the reply check unit 27 determines that no ACK signal was sent back, then the adjustment value calculation unit 28 determines the adjustment period Rt of a random length. The transmission trigger TG2 generated by the timing update unit 24V after that is delayed from the second trigger TG4 by the adjustment period Rt of a random length. In response to this transmission trigger TG2, the data transmission unit 22 sends the transmission data D2.

When next transmission data D2 is transmitted after the elapse of the fixed period T4 (e.g., 10 minutes) from then and the reply check unit 27 determines that no ACK signal was sent back, the adjustment value calculation unit 28 likewise sets a new adjustment period Rt of a random length. The transmission trigger TG2 generated by the timing update unit 24V after that is delayed from the second trigger TG4 by the new adjustment period Rt. In response to this transmission trigger TG2, the data transmission unit 22 sends the transmission data D2.

If the reply check unit 27 determines that an ACK signal was sent back, then the adjustment value calculation unit 28 maintains the adjustment period Rt to the same length rather than determining a new adjustment period Rt. Therefore, the transmission trigger TG2 generated by the timing update unit 24V after that is delayed from the second trigger TG4 by the adjustment period Rt that is the same length of the current adjustment period. In response to this transmission trigger TG2, the data transmission unit 22 sends the transmission data D2.

Figure 8:
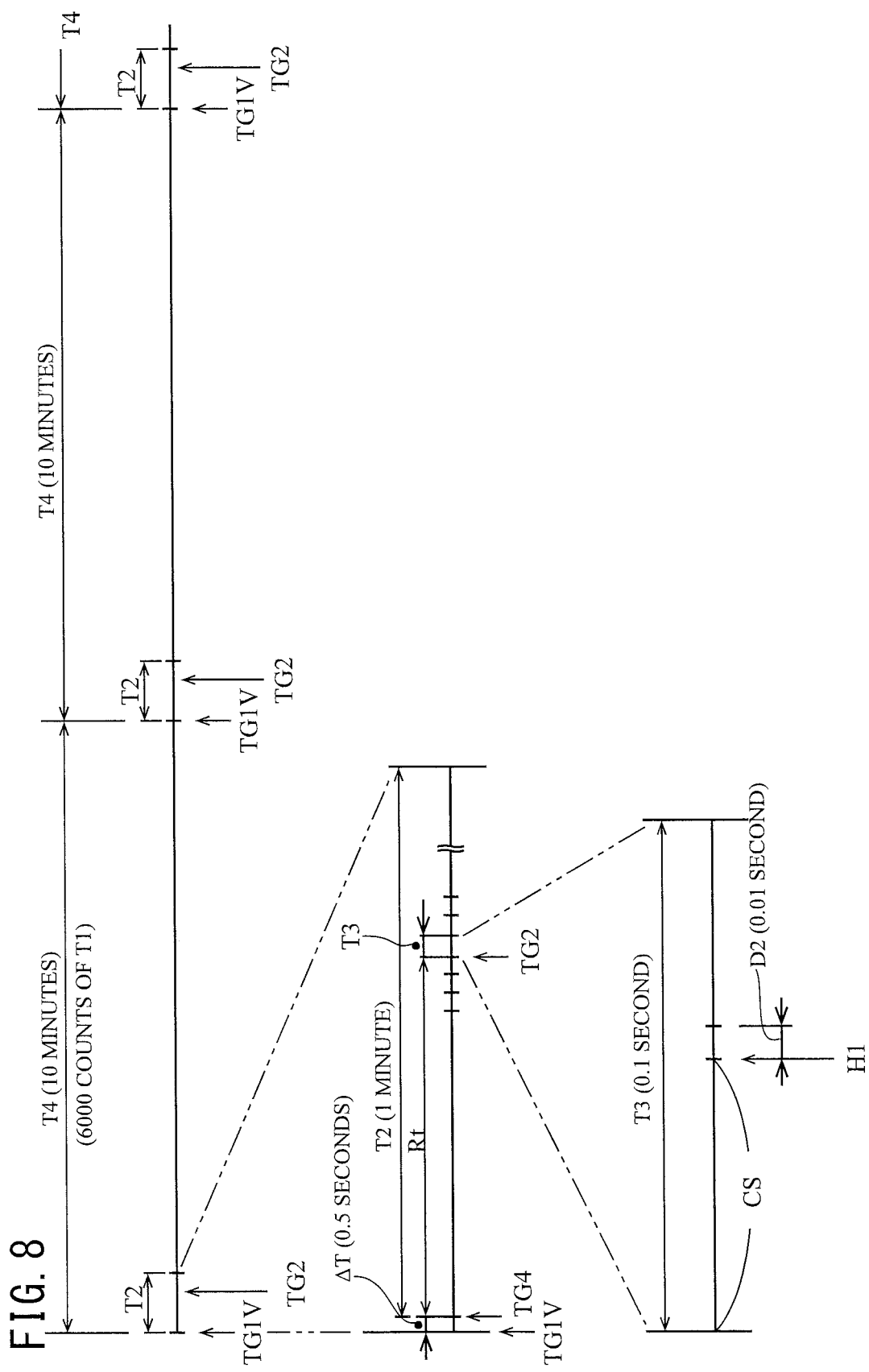
FIG. 8 is a time chart showing trigger generation timings.

FIG. 8 illustrates a conceptual diagram of the timings of generation of various triggers described above. TG1V, TG4, and TG2 respectively represent the timings of generation of the first trigger TG1V, the second trigger TG4, and the transmission trigger TG2.

As shown in FIG. 8, the first trigger generation unit 25AV generates the first trigger TG1V at every fixed period T4, so that the timing of measurement by the measurement unit 21 is fixed to every fixed period T4 irrespective of whether an ACK signal was sent back or not. The adjustment value calculation unit 28 determines the adjustment period Rt such as to vary randomly by unit of the prescribed allocation length T3 within a range of the prescribed maximum amplitude T2, from the timing at which the status data generation unit 26 generates the transmission data D2 (timing of generation of the second trigger TG4). In this embodiment, the prescribed maximum amplitude T2 is set to 1 minute, for example, which is 1/10 of the fixed period T4 (e.g., 10 minutes), and the prescribed allocation length T3 is set to 0.1 second. That is, the adjustment value calculation unit 28 determines a value obtained by multiplying a random number selected from 600 random numbers (=1 minute/0.1 second) by 0.1, which is the prescribed allocation length T3, as the adjustment period Rt.

In a concrete example of selecting one random number from 600 random numbers, similarly to the first embodiment, a value P of pressure measured by the measurement unit 21 is input to the random number generator function RAN(P) contained in the second control program PG2V to be described later. To be more specific, for example, the random number generator function RAN(P) extracts upper four digits of the input value P of pressure, for example, and produces a random number by determining the remainder after dividing an integer consisting of numerals of the 4 digits by 600. In another possible configuration, a random number calculation IC may be mounted on the circuit board 71, and the remainder after dividing a random number output by this IC by 600 may be determined as one of 600 random numbers from 0 to 599.

The data length (i.e., data length of a data frame) of the transmission data D2 wirelessly transmitted by the data transmission unit 22 is set to 0.01 second, for example, which is 1/10 of the prescribed allocation length T3. The data transmission unit 22 includes the carrier sense execution unit 22C. When the transmission trigger TG2 is generated, the carrier sense execution unit 22C performs a carrier sense before the transmission data D2 is sent. When a transmission channel is determined to be available for the data transmission unit 22, the transmission data D2 is sent, and when no transmission channel is available, the data transmission unit does not send the transmission data D2 and waits until a transmission channel becomes available. If it is possible to finish transmitting the transmission data D2 within a period from the generation of the transmission trigger TG2 until the elapse of time of the prescribed allocation length T3, the data transmission unit sends the transmission data D2, and if not, the data transmission unit 22 does not send the transmission data D2. In the case where the data transmission unit 22 does not send the transmission data D2, the same processing is performed as that when transmission data D2 was sent and no ACK signal was sent back.

In this embodiment, the CPU 23A of the slave terminal 20V executes first and second control programs PG1V and PG2V (see FIG. 9 and FIG. 10) corresponding to the first and second control programs PG1 and PG2 of the first embodiment. The first and second control programs PG1V and PG2V will be described below. The CPU 23A executes the first and second control programs PG1V and PG2V every time it receives an interrupt signal at an interval of 0.1 second, for example, as a periodic signal output from the oscillation circuit 75. In this embodiment, N1 is set to 6000 (=ten minutes×60 seconds/0.1 second) so that the fixed period T4 is 10 minutes. "FLG4" in the first control program PG1V represents a flag, which is "0" in the initial state.

Figure 9:
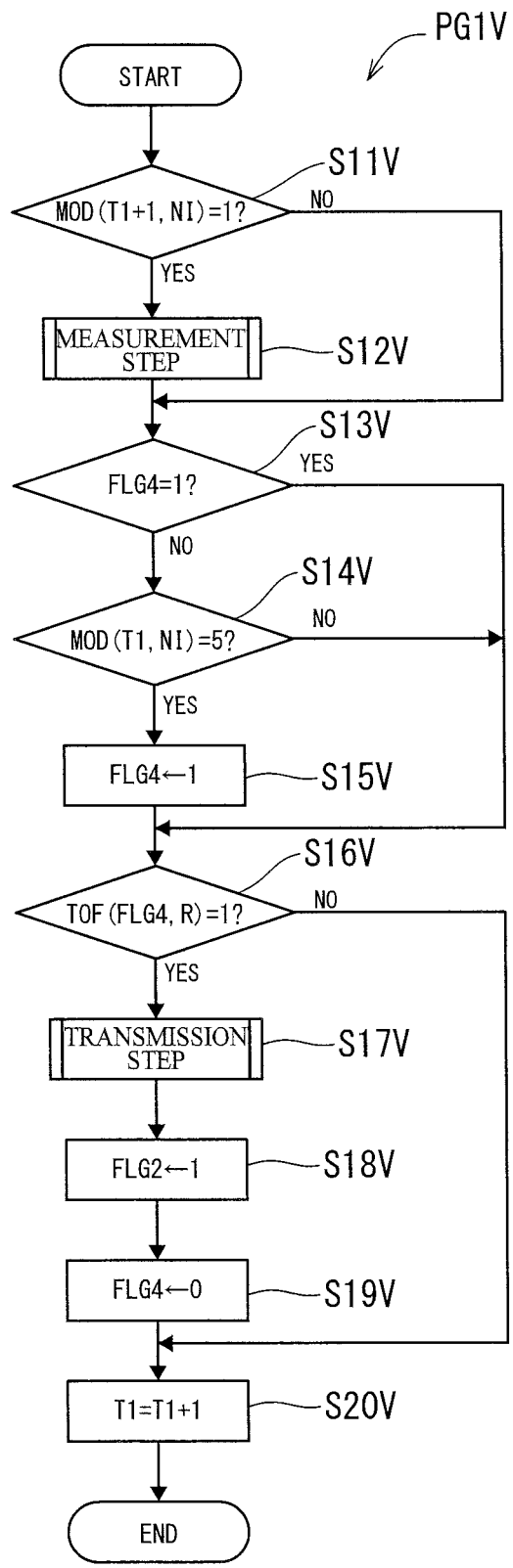
FIG. 9 is a flowchart of a first control program 1V.

As shown in FIG. 9, the CPU 23A executing the first control program PG1V determines whether or not the remainder after dividing "counter T1+1" by 6000 is "1" (S11V), and if the remainder is "1" (YES at S11V), then executes a measurement step (S12V). Namely, the CPU 23A executing this step S11V corresponds to the first trigger generation unit 25AV described above. Determining YES at step S11V corresponds to generation of the first trigger TG1V.

Upon executing the measurement step (S12V), the CPU 23A operates as the status data generation unit 26, i.e., receives a result of measurement by the pressure sensor 70 from the measurement circuit 74, converts it into a digital signal, and generates pressure data.

After executing the measurement step (S12V), the CPU 23A determines whether or not FLG4 is "1" (S13V), and if not "1" (NO at S13V), then determines whether or not the remainder after dividing "counter T1+1" by 6000 is "5" (S14V), and if YES, switches FLG4 from "0" to "1." Here, switching FLG4 from "0" to "1" corresponds to the generation of the second trigger TG4 described above, and the CPU 23A executing the step S14V described above corresponds to the second trigger generation unit 25BV described above. Through steps S13V to S15V, the second trigger TG4 is generated after the prescribed delay time Δt1 (0.5 seconds) from the generation of the first trigger TG1V.

When FLG4 has switched from "0" to "1," the function TOF(FLG4, R) at step S16V determines whether or not the number of counts of interrupt signals from then has matched the random number R. Since the initial value of random number R is "0," the number of counts of interrupt signals matches the random number R immediately after FLG4 has switched from "0" to "1," so that the function TOF(FLG4, R) outputs "1" (YES at S16V), and a transmission step (S17V) is executed. When the random number R is set to other values than "0," the transmission step (S17V) is executed after the elapse of time until the number of counts of interrupt signals since FLG4 switched from "0" to "1" has matched the random number R. Namely, a value obtained by multiplying the random number R by 0.1 second, which is the period of interrupt signals, corresponds to the adjustment period Rt described above.

Here, the CPU 23A executing step S16V corresponds to the timing update unit 24V described above. Determining YES at step S16V corresponds to generation of the transmission trigger TG2. The CPU 23A executing the transmission step (S17V) corresponds to the data transmission unit 22. In the transmission step (S17V), the CPU generates transmission data D2, performs the carrier sense, and sends the transmission data D2 as the data transmission unit 22 as described in the foregoing. Depending on the result of the carrier sense, the transmission data D2 may not be sent due to interference.

When the transmission step (S17V) is executed, FLG3 is set to "1" from "0," and FLG4 is reset to "0" from "1" irrespective of whether or not the transmission data D2 has been sent. (S18V, 19V). The first control program PG1V lastly increments the counter T1 by 1 (S20V) and is ended.

Figure 10:
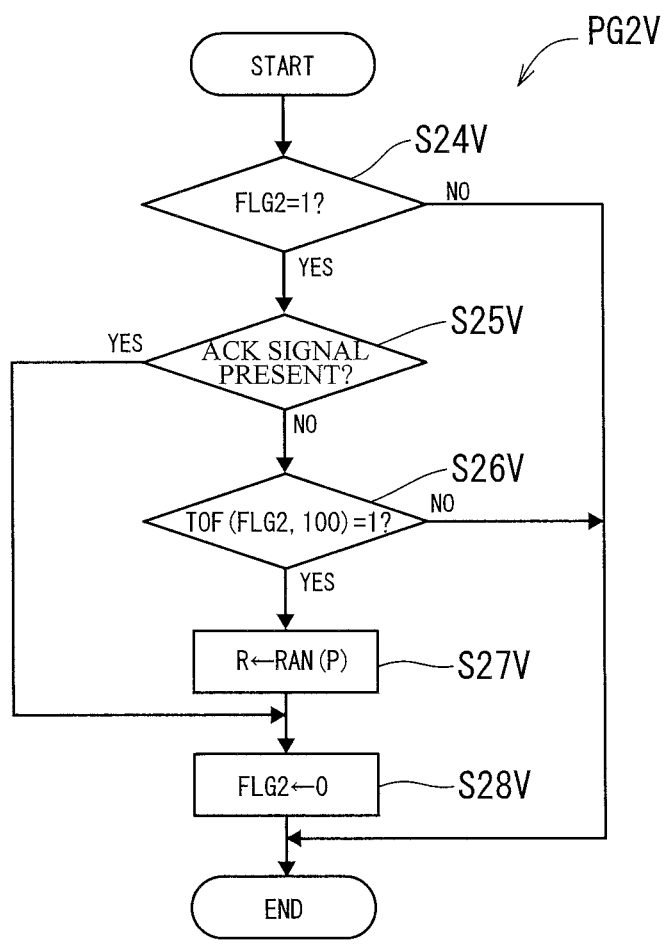
FIG. 10 is a flowchart of a second control program 2V.

As shown in FIG. 10, the CPU 23A executing the second control program PG2V determines whether or not FLG2 is "1" (S24V), and if not "1," then immediately exits the second control program PG2V (NO at S24V). Namely, the CPU 23A in effect executes the second control program PG2V only when FLG2 is set to "1" in the first control program PG1V (only when the transmission step (S17V) was executed). The CPU 23A then determines whether or not the wireless circuit 76 of the slave terminal 20V has received an ACK signal (S25V), and if an ACK signal has been received (YES at S25V), resets FLG2 to "0," and exits the second control program PG2V (S28V).

When failing to receive an ACK signal (NO at S25V), the CPU determines at step S26V whether or not the number of counts of interrupt signals since FLG2 was set to "1" from "0" has matched 100 using the function TOF (FLG2, 100). The CPU waits for an ACK signal until the internal counter of the function TOF (FLG2, 100) has counted 100, i.e., until 10 seconds have passed after FLG2 turned "1" (NO at S26V). If no ACK signal was received after the elapse of 10 seconds after FLG2 turned "1" (NO at S25V, YES at S26V), the CPU stores a value obtained by inputting the measurement result of pressure to the random number generator function RAN (P) mentioned above in the random number R, resets FLG2 to "0," and exits the second control program PG2V (S28V).

According to the monitoring system 100 of this embodiment, the timing of measurement by the measurement unit 21 is set to arrive at every fixed period T4 irrespective of whether or not an ACK signal was sent back, and the slave terminal 20V that did not receive an ACK signal sends the transmission data D2 at a timing shifted by the adjustment period Rt that is randomly determined. The slave terminal 20V that did receive an ACK signal transmits at a timing that is the same as the current transmission timing. This configuration provides similar advantageous effects as those of the slave terminal 20 of the first embodiment.

Since the prescribed maximum amplitude T2 of the adjustment period Rt is 1/10 or less of the fixed period T4 for the slave terminal 20V of this embodiment, the transmission timings of slave terminals 20V can be shifted from one another to avoid interference while the overall schedule of the plurality of slave terminals 20V transmitting the status data D1 at every fixed period T4 is not changed. The adjustment period Rt is determined such as to vary randomly by unit of the prescribed allocation length T3 within a range of the prescribed maximum amplitude T2. Since the prescribed allocation length T3 is 1/600 of the prescribed maximum amplitude T2, it is possible to avoid interference for up to 600 slave terminals 20V.

Moreover, the slave terminal 20V of this embodiment is able to prevent interference that may be caused by a transmission timing delayed due to the carrier sense, since the data transmission unit 22 transmits only when the period after the generation of the transmission trigger TG2 and a determination by the carrier sense execution unit 22C until the completion of transmission of the status data D1 is shorter than the prescribed allocation length T3, which is set for the timing of generation of the transmission trigger TG2 by the timing update unit 24. Slave terminals 20V that did not send transmission data D2 due to interference in accordance with the result of the carrier sense, transmit at a timing shifted by a randomly determined adjustment period Rt after the fixed period T4 thereafter, similarly to the slave terminals 2020V that did not receive an ACK signal. Interference is thus avoided smoothly.

Other Embodiments (1) The prescribed maximum amplitude T2 of the adjustment period Rt is set to 1/10 or less of the fixed period T4 for the slave terminal 20 in the embodiments described above. As long as the prescribed maximum amplitude T2 of the adjustment period Rt is shorter than the fixed period T4, the prescribed maximum amplitude T2 may be set to any value. In the case where the transmission data D2 from the plurality of slave terminals 20 is monitored at every fixed period T4, the prescribed maximum amplitude T2 of the adjustment period Rt should preferably be ½ or less of the fixed period T4.

(2) The slave terminal 20 in the above embodiments performs the carrier sense when sending the transmission data D2. Instead, the slave terminal may be configured to send the transmission data D2 without carrier sensing.

(3) The reply check unit 27 discards the transmission data D2 to which it determined no ACK signal was sent back in the above embodiments. Instead, previous transmission data D2 may be sent with new transmission data D2 in the next transmission after the fixed period T4.

(4) In the second embodiment, the timing of generation of a transmission trigger TG2 is shifted forward or backward as the case may be from the current generation timing if no ACK signal is sent back. The generation timing may instead be either delayed only, or advanced only, from the current generation timing of the transmission trigger TG2.

(5) The monitoring system 100 is used for monitoring livestock in the embodiments described above. The monitoring system 100 may be used for monitoring plants, conditions of various parts of a vehicle, or conditions in a chemical plant.

(6) Other sensors such as a temperature sensor or acceleration sensor may be connected to the measurement circuit 74 instead of or in addition to the pressure sensor 70 in the slave terminals 20 and 20V to measure the body temperature or behavior as a condition of the cow 10.

In the case where an acceleration sensor is connected, the CPU 23A of the slave terminal 20 or 20V may be configured to integrate acceleration data measured by the acceleration sensor and acquired several times during a period in which pressure data or temperature data measured by the pressure sensor 70 or a temperature sensor is acquired once.

While specific examples of the techniques included in the claims are disclosed in the specification and drawings, the techniques set forth in the claims are not limited to these specific examples but rather include various modifications and alterations of the specific examples, as well as partial extracts from the specific examples.

DESCRIPTION OF THE REFERENCE NUMERAL

10 Cow (livestock, monitoring target)
10S Stomach
20, 20V Slave terminal
21 Measurement unit
22 Data transmission unit
22C Carrier sense execution unit
24, 24V Timing update unit
25, 25V Trigger generation unit
26 Status data generation unit
27 Reply check unit
28 Adjustment value calculation unit
30 Master terminal (monitoring apparatus)
50 Cloud server (monitoring apparatus)
70 Pressure sensor
73 Waterproof case
D1 Status data
D2 Transmission data
P Pressure
PG1 First control program
PG1V First control program 1V
PG2 Second control program
PG2V Second control program 2V
Rt Adjustment period
T3 Prescribed allocation length (shifted period)
T4 Fixed period
TG2 Transmission trigger
TG3 Measurement start trigger
ΔT1 Prescribed delay time

The invention claimed is:

1. A slave terminal comprising:
a data transmission unit that wirelessly transmits status data relating to a condition of a monitoring target to a monitoring apparatus in response to a transmission trigger at every fixed period;
a reply check unit that determines whether or not an ACK signal was sent back from the monitoring apparatus in response to the status data that was transmitted;
an adjustment value calculation unit that determines an adjustment period of a random length when the reply check unit has determined that there was no reply;
a timing update unit that outputs a measurement start trigger after the adjustment period has elapsed when the reply check unit has determined that there was no reply, the timing update unit outputting the measurement start trigger without the adjustment period when the reply check unit has determined that there was a reply; and
a trigger generation unit that outputs the transmission trigger after counting the fixed period in response to the measurement start trigger.

2. The slave terminal according to claim 1, further comprising a carrier sense execution unit that performs a carrier sense every time the transmission trigger is generated and determines whether or not a channel to be used by the data transmission unit is available,
the data transmission unit sending the status data on condition that the transmission trigger has been generated and the channel is determined to be available as a result of the carrier sense.

3. The slave terminal according to claim 1, wherein the data transmission unit does not transmit the status data again when the reply check unit determines that there was no reply.

4. The slave terminal according to claim 1, wherein the adjustment period has a maximum absolute value that is ½ or less of the fixed period.

5. The slave terminal according to claim 1, further comprising a measurement unit that measures a condition of the monitoring target, and
a status data generation unit that generates the status data based on a measurement result of the measurement unit.

6. A slave terminal comprising:
a data transmission unit that wirelessly transmits status data relating to a condition of a monitoring target to a monitoring apparatus in response to a transmission trigger at every fixed period;
a reply check unit that determines whether or not an ACK signal was sent back from the monitoring apparatus in response to the status data that was transmitted;
an adjustment value calculation unit that determines an adjustment period of a random length when the reply check unit has determined that there was no reply;
a trigger generation unit that sequentially generates the transmission trigger at the every fixed period; and
a timing update unit provided to the trigger generation unit, the timing update unit shifting timings of generation of the transmission triggers that are sequentially generated thereafter from a current timing of generation of the transmission trigger by the adjustment period when the reply check unit has determined that there was no reply.

7. The slave terminal according to claim 6, wherein, each time the reply check unit determines that there was no reply, the timing update unit updates timings of generation of the transmission triggers that are sequentially generated thereafter either by only delaying or advancing the timings from the current timing of generation of the transmission trigger.

8. The slave terminal according to claim 7, further comprising a carrier sense execution unit that performs a carrier sense every time the transmission trigger is generated and determines whether or not a channel to be used by the data transmission unit is available,
the data transmission unit sending the status data on condition that the transmission trigger has been generated and the channel is determined to be available as a result of the carrier sense, the data transmission unit sending the status data only when a period after generation of the transmission trigger and a determination by the carrier sense execution unit until completion of transmission of the status data is shorter than a minimum unit of time for shifting a timing of generation of the transmission trigger by the timing update unit.

9. The slave terminal according to claim 6, further comprising a carrier sense execution unit that performs a carrier sense every time the transmission trigger is generated and determines whether or not a channel to be used by the data transmission unit is available,
the data transmission unit sending the status data on condition that the transmission trigger has been generated and the channel is determined to be available as a result of the carrier sense,
the data transmission unit sending the status data only when a period after generation of the transmission trigger and a determination by the carrier sense execution unit until completion of transmission of the status data is shorter than a minimum unit of time for shifting a timing of generation of the transmission trigger by the timing update unit.

10. The slave terminal according to claim 6, wherein the data transmission unit does not transmit the status data again when the reply check unit determines that there was no reply.

11. The slave terminal according to claim 6, wherein the adjustment period has a maximum absolute value that is ½ or less of the fixed period.

12. The slave terminal according to claim 6, further comprising a measurement unit that measures a condition of the monitoring target, and
a status data generation unit that generates the status data based on a measurement result of the measurement unit.

13. A wireless transmission method for wirelessly transmitting status data relating to a condition of a monitoring target from a slave terminal to a monitoring apparatus at every fixed period, wherein
when the slave terminal has received an ACK signal from the monitoring apparatus in response to a transmission of the status data, the status data to be sent thereafter at the every fixed period is transmitted at a same timing as a current transmission timing, whereas, when the slave terminal has not received the ACK signal, the status data to be sent thereafter at the every fixed period is transmitted at a timing that is shifted by a randomly determined adjustment period from the current transmission timing.

* * * * *